(12) United States Patent
Meindl et al.

(10) Patent No.: US 11,130,260 B2
(45) Date of Patent: Sep. 28, 2021

(54) SYSTEM FOR CASTING A COMPONENT BY AN ADJUSTABLE MOLDING BOX

(71) Applicant: CUBES GMBH, Salzburg (AT)

(72) Inventors: Edwin Meindl, Lienz (AT); Christian Falch, Nassereith (AT)

(73) Assignee: Cubes GmbH, Salzburg (AT)

( * ) Notice: Subject to any disclaimer, the term of this patent is extended or adjusted under 35 U.S.C. 154(b) by 502 days.

(21) Appl. No.: 15/570,250

(22) PCT Filed: Apr. 28, 2016

(86) PCT No.: PCT/EP2016/059554
§ 371 (c)(1),
(2) Date: Oct. 27, 2017

(87) PCT Pub. No.: WO2016/174167
PCT Pub. Date: Nov. 3, 2016

(65) Prior Publication Data
US 2018/0126601 A1    May 10, 2018

(30) Foreign Application Priority Data

Apr. 29, 2015  (DE) .................... 10 2015 106 577.0

(51) Int. Cl.
*B29C 33/30*       (2006.01)
*B29C 39/44*       (2006.01)
(Continued)

(52) U.S. Cl.
CPC ............ *B29C 33/308* (2013.01); *B29C 39/44* (2013.01); *G06F 30/00* (2020.01);
(Continued)

(58) Field of Classification Search
None
See application file for complete search history.

(56) References Cited

U.S. PATENT DOCUMENTS

| 5,330,343 A | 7/1994 | Berteau |
| 5,546,313 A | 8/1996 | Masters |

(Continued)

FOREIGN PATENT DOCUMENTS

| EP | 2 565 018 A1 | 3/2013 |
| WO | WO 86/02877 A1 | 5/1986 |
| WO | 2011034434 A1 | 3/2011 |

OTHER PUBLICATIONS

International Search Reported dated Jun. 29, 2016 for corresponding International Patent Application No. PCT/EP2016/059554, including Eng. translation, 11pp.
(Continued)

*Primary Examiner* — Benjamin A Schiffman
(74) *Attorney, Agent, or Firm* — Lewis Roca Rothgerber Christie LLP

(57) ABSTRACT

The present invention relates to a system for casting a component by an adjustable molding box. A generating unit serves for generating a component model of the component to be molded, a transmitting unit serves for transmitting the component model via a data network to a determining unit, and the determining unit serves for determining a casting mold model based on the component model. The determining unit is configured such that adjustment data for adjusting the adjustable molding box based on the casting mold model are generatable. A control unit is coupled to the determining unit such that the adjustment data are providable to the control unit, wherein the control unit is configured such that the control unit adjusts the molding box, based on the adjustment data, with a casting mold, which is indicative for a negative profile of the component, and the component is castable by the adjusted molding box.

3 Claims, 1 Drawing Sheet

Figure 1:
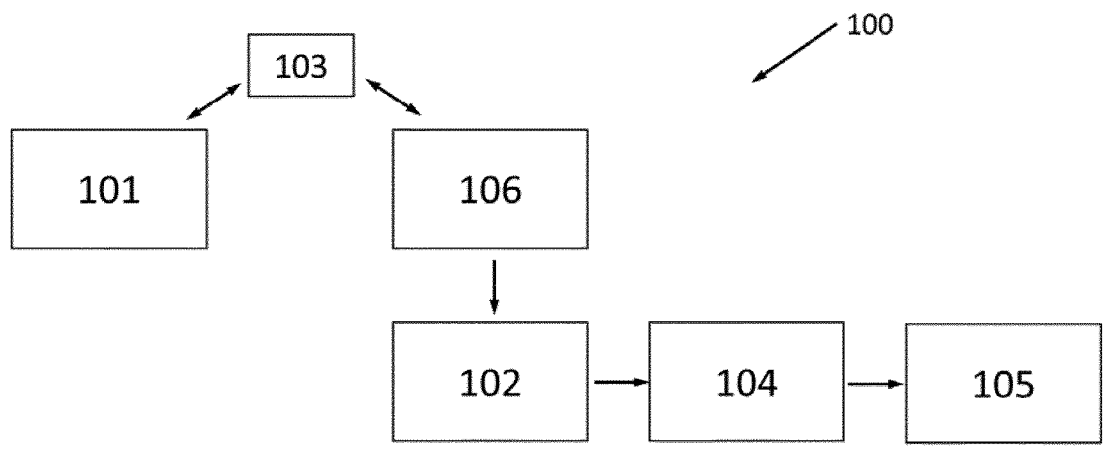

(51) Int. Cl.
  *G06F 30/00*   (2020.01)
  *G06F 111/02*   (2020.01)
  *G06F 111/20*   (2020.01)
  *G06F 113/22*   (2020.01)

(52) U.S. Cl.
  CPC ....... *G06F 2111/02* (2020.01); *G06F 2111/20* (2020.01); *G06F 2113/22* (2020.01)

(56) References Cited

U.S. PATENT DOCUMENTS

| | | |
|---|---|---|
| 5,796,620 A | 8/1998 | Laskowski et al. |
| 6,116,888 A | 9/2000 | Johnston et al. |
| 6,354,531 B1 | 3/2002 | Aalto et al. |
| 6,354,561 B1 | 3/2002 | Fahrion |
| 6,836,699 B2 * | 12/2004 | Lukis ............... B22C 19/04 264/401 |
| 2003/0130818 A1 | 7/2003 | Page |
| 2008/0302500 A1 | 12/2008 | Winkler |
| 2009/0273109 A1 | 11/2009 | Johnson et al. |

OTHER PUBLICATIONS

Written Opinion dated Jun. 29, 2016 for corresponding International Patent Application No. PCT/EP2016/059554, 8pp.
Office action dated Dec. 16, 2015 for corresponding German Patent Application No. 10 2015 106 577.0, 7pp.
Office action issued in parallel European Application No. 16 723 673.6, dated Nov. 28, 2019, 6 pages.

* cited by examiner

SYSTEM FOR CASTING A COMPONENT BY AN ADJUSTABLE MOLDING BOX

CROSS-REFERENCE TO RELATED APPLICATIONS

The present application is a national phase U.S. patent application derived from the international patent application PCT/EP2016/059554 (published as WO 2016/174167 A1), and claims the benefit of the filing date of the German patent application DE 10 2015 106 577.0, filed on Apr. 29, 2015, the disclosures of which are hereby incorporated by reference in their entirety.

FIELD OF THE INVENTION

The present invention relates to a system for casting a component by an adjustable molding box as well as a method for casting a component by an adjustable molding box. Furthermore, the present invention relates to a computer-readable storage medium and a computer program.

BACKGROUND OF THE INVENTION

Nowadays, in tool making (or tool design and construction), mold making (or mold design and construction) and model making, so-called "HARD TOOLS" still play a great role. The basic principle of these devices is formed by block structures, which reflect the negative of the contour shape of the component to be spanned.

These full (or solid) blocks may consist for example of aluminum, epoxy or Ureol. The more complex the geometry of the three-dimensional model, the greater the loss of material with respect to the ingot (or raw block). For three-dimensional models made of Ureol, these blocks must be glued together elaborately beforehand, because boards (or sheets) of Ureol are available only in limited thicknesses. The gluing together of the Ureol boards is a time-intensive work step. As an alternative, the possibility exists to cast the three-dimensional model close to contour, such that less loss of material and less post-processing steps are necessary.

However, individual casting molds must be produced for the casting process in order to fabricate differently shaped ingots.

For example, adjustable molding boxes, which can be adapted individually to different shapes, are provided for adjusting individual casting molds. Adjustable casting boxes are known for example from U.S. Pat. No. 6,354,531 B1, WO 86/02877 A1, and U.S. Pat. No. 5,546,313.

SUMMARY OF THE INVENTION

In view of the shortcomings of prior component casting systems, there may be a need to fabricate and provide quickly and cost-efficiently individual ingots for the tool making, the mold making and the model making.

According to an exemplary embodiment of the present invention, there is provided a system for casting a component by an adjustable molding box. The system has a generating unit for generating a component model of the component to be molded, a transmitting unit for transmitting the component model via a data network to a determining unit, and the determining unit for determining a casting mold model based on the component model. The transmitting unit serves for transmitting the component model via a data network to the determining unit. The determining unit is configured such that adjustment data for adjusting the adjustable molding box based on the casting mold model are generatable (or can be generated). A control unit is coupled to the determining unit such that the adjustment data are providable (or can be provided) to the control unit, wherein the control unit is configured such that the control unit adjusts the molding box based on the adjustment data with a casting mold, which is indicative for a negative profile of the component, and the component is castable (or can be cast) by the adjustable molding box.

According to further example embodiment of the present invention, there is provided a method for casting a component by an adjustable molding box. According to the method, a component model of a component to be molded is generated. The component model is transmitted via a data network to a determining unit. A casting mold model is generated by the determining unit based on the component model. Further, adjustment data for adjusting the adjustable molding box based on the casting mold model are generated, such that the molding box is adjusted with a casting mold, which is indicative for a negative profile of the component, and the component can be cast by the adjustable molding box.

In an exemplary embodiment, the component may for example be a three-dimensional object, such as it may represent for example a tool block, a mold block or a model block. The component may concern in particular a cast component, which can be cast for example from Ureol or aluminum.

According to exemplary embodiments, the adjustable molding box may form an adjustable casting mold. The adjustable molding box may have for example adjustable mold elements, which can be shifted relatively to each other such that a desired casting mold, which may be prescribed by the casting mold model and which may correspond in particular to a negative shape of the component, may be adjusted (compare with a needle bed). The individual mold elements may be controllable for example by the control unit, in order to adjust a desired casting mold on this basis. After the adjusting of the casting mold, the latter may be filled for example with a casting material. After the curing (or hardening) of the material, the ready-made, hardened component may be taken out of the casting mold.

In an exemplary embodiment, the adjustable mold elements may be present for example tightly packed, e.g. abutting against each other, and e.g. corresponding ends of the adjustable mold elements, such as for example adjustment rods, may form the casting mold. The adjustable mold elements may be formed for example in a first set and in a second set, wherein both sets are opposite to each other. Between the respective sets of adjustment elements, a cavity may be provided, into which the pourable casting compound is filled. The adjustment elements in each set may be shifted relatively to each other, such that the ends of the respective adjustment elements possibly form a desired shape of the cavity and thus a desired shape of the component to be cast (i.e. the casting mold, which may be indicative for a negative profile of the component). The adjustment elements may bear for example on each other, such that a firm (or strong) interconnection of the adjustment elements relative to each other is possibly creatable due to the gravity. Thus, the adjustment elements may be laid on top of one another, and require no complex connection mechanism. For example, the individual adjustment elements may lie on top of each other, and may be shifted horizontally relative to each other individually or pair-wisely. The respective sets of adjustment elements may be opposing each other for example horizontally, and thus may be shifted in a horizontal direction towards each other or away from each other.

In an exemplary embodiment, in the context of this application, the term "transmitting unit" may be understood to refer in particular to an automated and preferably network-based arrangement of entities, which may be coupled or coupleable to each other capably to communicate, and which may be capable to transmit data, e.g. of the component model, preferably without interposition of an operating person, via the data network. The entities may be for example network elements, such as for example routers or modems, which may be spatially separate, and which may be connected to each other capably to communicate for example via the internet as the data network. The generating unit may be coupled to a first entity and the control unit may be coupled to a second entity.

In an exemplary embodiment, the generating unit may be, for example, a computing unit, which may be operable by a user, and on which the component model of the component to be molded may be generated. For example, a CAD system can be installed on the generating unit, with which CAD system the component model can be constructed. Thereby, for example, different boundary conditions, such as length, width and height, can be taken into account. The component model may have, for example, a data set, in which information relating to the geometric arrangement, the material composition and/or other parameters, for example temperature resistance parameters or acid resistance parameters, of the component to be molded are present.

In an exemplary embodiment, the data set may be generated on the generating unit for example by a CAD program (Computer Aided Design). The data set thus may form a three-dimensional mapping of the component model.

According to exemplary embodiments, in the context of this application, the term "determining unit" may be understood to refer in particular to a device having a processor resource, which may be configured for processing, in particular by programming measures, the provided data of the component model, and which may be further configured for generating the casting mold model based on the component model. During this processing, the processor resource may be coupled unidirectionally or preferably bidirectionally and capably to communicate with a data storage resource of the generating unit, in order to possibly read data therefrom and/or to store data therein. The generating unit may be formed for example as a computer and/or processor, or as a plurality of co-operating computers or processors (which may be spatially close to each other or may be spatially separate from each other).

In an exemplary embodiment, for example, a CAD system may be installed on the generating unit, by which CAD system the component model can be constructed. Among others, different boundary conditions, such as length, width and height, may for example be taken into account. In other words, on the generating unit, there may be generated a model of the component with the desired geometric embodiment. The data set, in particular the CAD data, may be subsequently transmitted by the transmitting unit to the determining unit.

In an exemplary embodiment, the generating unit may further generate, based on the casting mold model, CAM data as adjustment data for adjusting the adjustable molding box. The generating unit may read for example the CAD data, which may have been transmitted from the generating unit, and which may comprise the geometry data for the raw part, the finished part and the clamping device. If it is necessary that the geometry must be changed or that new geometries (models) must be generated, new CAM data may be generated accordingly. The raw material and the adjustment of the molding box may be determined. The CAM data account for the boundary conditions and suitable translating movements and cutting data of the molding box and/or of the adjustable mold elements. For example, the operations, which may be defined in the CAM, may be stored together with all parameters as a "source code" in a CAM format.

In an exemplary embodiment, the determining unit, the control unit, the transmitting unit and/or the generating unit may be embodied and networked for bidirectional data exchange. Accordingly, for example, the determining unit may obtain CAD data of the component, and may transmit the CAM data generated therefrom back to the generating unit.

In an exemplary embodiment, further, due to the bidirectional data transfer, a status request may be transmitted to the determining unit and/or to the control unit from the generating unit at each arbitrary point in time, in response to which the determining unit may transmit back to the generating unit the status (i.e. the progress of the process) of the determining of the casting mold model and/or the control unit transmits back to the generating unit the status (i.e. the progress of the process) of the adjustment of the molding box and/or the progress of the casting process. Thus, the progress of the process can be inquired permanently at a desired point in time.

In an exemplary embodiment, the determining unit may further determine e.g. volume data of the casting mold and/or of the component and also data relating to the delivery time of the component and to the costs of the fabrication of the component, and may transmit (these data) to the adjustment unit.

In an exemplary embodiment, the control unit may also be understood to refer in particular to a device having a processor resource, which may be configured for processing, in particular by programming measures, of the provided data of the casting mold model and which may further be configured for controlling the molding box. During this processing, the processor resource may be coupled unidirectionally or preferably bidirectionally and capably to communicate to a data storage resource of the control unit, in order to read data therefrom and/or to store these data therein. The control unit may be embodied for example as a computer and/or processor or as a plurality of co-operating computers or processors (which may be spatially close to each other or which may be spatially separated from each other).

In an exemplary embodiment, the control unit may be configured, based on the casting mold model, to generate machine-readable commands, in order to adjust the molding box therewith. The control unit may be coupled to the adjustable molding box, such that the generated casting mold model may prescribe the casting mold in the molding box. Thereafter, the component may be cast by the casting mold in a casting process.

In an exemplary embodiment, with the present invention, the generating unit may be arranged spatially separate from the determining unit and/or the control unit, and may be coupled by the transmitting unit. Thus, a component model can remotely be generated from the determining unit, and be processed at the remote determining unit and the control unit. The adjustable molding box may be arranged at the place (or site) of the control unit. In other words, a component model may thus be created peripherally (or locally) at a generating unit, and the component may be cast centrally with a molding box. In particular, plural generating units can be coupled to one and the same determining unit and/or control unit via according transmitting units, such that a plurality of different component models, which may have been generated at the site of the generating unit, can be processed at one and the same place (or site), at which the molding box may be located, and may be cast by the molding box.

In an exemplary embodiment, thus, in particular in tool making, mold making, or model making, the necessary cost for generating an ingot (or raw block) can be reduced, because it may no longer be necessary to provide an according molding box at the site of the generating unit. With the present invention, one and the same molding box may process different component models from different generating units. Thus, the hardware use and the corresponding cost may be reduced significantly, because instead of a plurality of molding boxes, only one molding box can be sufficient in order to process the plurality of component models from most different generating units.

According to a further exemplary embodiment, the determining unit may be configured such that a material of the component to be cast is adjustable. The user may input material parameters for example directly on the generating unit or by means of an input mask of the control unit. Hereby, the user may operate the input mask of the control unit via the data network.

According to a further exemplary embodiment, the determining unit may be configured such that an oversize of the component to be cast may be adjustable. An oversize may serve in particular for defining a desired later post-processing of the component. The oversize may be effected in different dimensions, for example in the z-direction.

In an exemplary embodiment, the determining unit may determine automatically specific sizes (or measures) of the oversize based on the CAD data of the component. Further, the oversize, which may have been determined by the determining unit, may, in the case of a bidirectional data transmission, be transmitted between the determining unit. Furthermore, an oversize may be prescribed at the generating unit and may be transmitted to the determining unit.

According to a further exemplary embodiment, the generating unit may be spatially separate from the determining unit and/or the control unit.

According to a further exemplary embodiment, the system further may have the adjustable molding box, which has the adjustable casting mold, which may be indicative for a negative profile of the component. The casting mold may be configured such that the component may be castable (or can be cast) by the adjustable molding box.

According to a further exemplary embodiment, the control unit may be configured such that a fabrication time and a delivery time of the cast component to a delivery address can be determined and/or read out. In one exemplary embodiment, also the generating unit may be present at the delivery address. In a further exemplary embodiment, the generating unit may be spatially separate from the delivery address.

According to a further exemplary embodiment of the present invention, a computer-readable storage medium may be described, in which a program for casting a component by an adjustable molding box is stored. The computer-readable storage medium has, when the program is executed by a processor (e.g. of the determining unit), the following method steps:

determining a casting mold model based on a component model, wherein the component model is indicative for the component to be molded and the component model is transmittable via a data network, determining adjustment data for adjusting the adjustable molding box based on the casting mold model, such that the molding box is adjusted with a casting mold, which is indicative for a negative profile of the component, and the component is castable by the adjustable molding box.

According to a further exemplary embodiment of the present invention, a computer program for casting a component by an adjustable molding box is described. The computer program is configured, if it is executed by a processor, to execute the method described above for casting a component by an adjustable molding box.

In an exemplary embodiment, the computer program may be implemented as a computer-readable command code in each suitable programming language, such as for example in JAVA, C++, .net, C#, etc. The computer program may be stored on a computer-readable storage medium (CD-ROM, DVD, Blu-ray Disk, Solid-Disk, removable disk drive, volatile or non-volatile storage, built-in storage/processor, etc.). The command code may command a computer or other programmable devices, such as for example the generating unit and/or the control unit, such that the desired functions are possibly executed. Furthermore, the computer program may be provided in the data network, such as for example the internet (e.g. website-based or cloud-based), from where it can be operated or downloaded by a user as needed.

The invention may be realized both by a computer program, i.e. a software, and also by one or more special electric circuits, i.e. in hardware, or in arbitrary hybrid form, i.e. by software components and hardware components.

It is pointed out that the embodiments described herein represent only a limited selection of possible embodiment variants of the invention. Thus, it is possible to combine the features of individual embodiments in a suitable manner, such that with the embodiment variants that are explicit herein, a plurality of different embodiments are to be considered as being obviously disclosed for the skilled person. In particular, some embodiments of the invention are described by device claims and other embodiments of the invention by method claims. However, it will immediately become apparent for the skilled person upon reading this application that, unless it is not indicated explicitly otherwise, in addition to a combination of features, which belong to one type of invention object, also an arbitrary combination of features, which belong to different types of invention objects, are possible.

SHORT DESCRIPTION OF THE DRAWINGS

Figure 2:
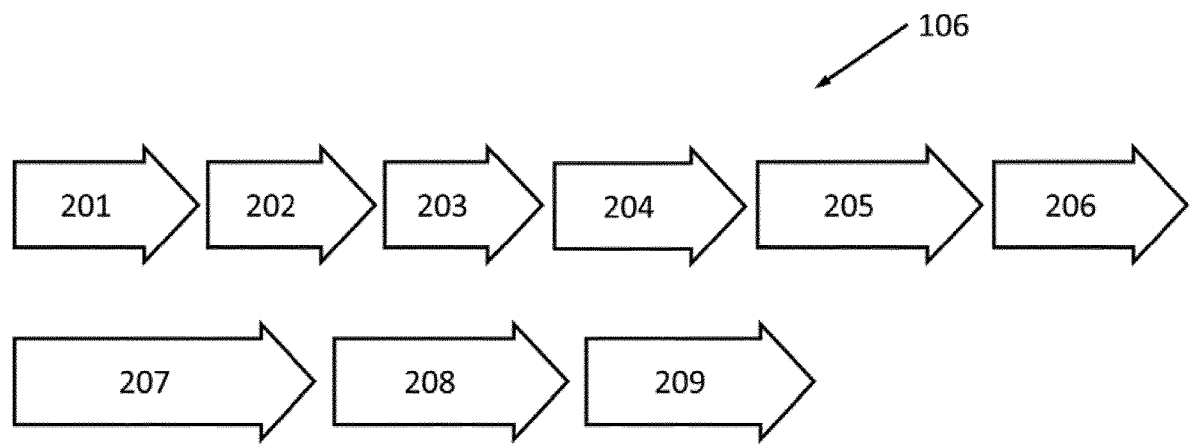

In the following, embodiment examples are described in more detail for a further explanation and a better understanding of the present invention with reference to the appended drawings. In the drawings:

FIG. 1 shows a schematic representation of the system for casting a component by an adjustable molding box according to an exemplary embodiment of the present invention, and FIG. 2 shows a schematic representation of a process diagram of a method for casting a component by an adjustable molding box according to an exemplary embodiment of the present invention.

DETAILED DESCRIPTION OF EXEMPLARY EMBODIMENTS

Same or similar components in different figures are provided with the same reference numerals. The representations in the figures are schematic.

FIG. 1 shows a schematic representation of a system 100 for casting a component 105 by an adjustable molding box 104 according to an exemplary embodiment of the present invention. A generating unit 101 serves for generating a component model of the component 105 to be molded. A transmitting unit 103 serves for transmitting the component model to a determining unit 106 via a data network. The determining unit 106 serves for determining a casting mold model based on the component model. The determining unit 106 is configured such that adjustment data for adjusting the adjustable molding box 104 based on the casting mold model are generatable (or can be generated). A control unit 102 is coupled to the determining unit 106 such that the adjustment data are providable to the control unit 102, wherein the control unit 102 is configured such that the control unit 102 adjusts the molding box 104, based on the adjustment data, with a casting mold, which is indicative for a negative profile of the component 105, and the component 105 is castable by the adjustable molding box 104.

Hereby, the generating unit 101 is arranged spatially separate from the control unit 102 and/or the determining unit 106. The transmitting unit 103 couples the generating unit 101 to the determining unit 106. For example, a data transmission may be provided by the transmitting unit 103 via the Internet.

The generating unit 101 is for example a computing unit, which is operable by a user and on which the component model of the component to be molded can be generated. For example, a CAD system, with which the component model can be constructed, is installed on the generating unit 101. Hereby, for example different boundary conditions, such as length, width and height, can be taken into account.

The determining unit 106 is coupled to the transmitting unit 103 and further to the control unit 102 and the adjustable molding box 104, such that the casting mold in the molding box is adjusted by the control unit using the generated casting mold model. Thereafter, the component 105 can be cast in a casting process by the casting mold. The component model can thus be generated by the generating unit 101 remotely from the determining unit 106 and/or the control unit 102, and can be processed at the distant determining unit 106 and/or control unit 102. The adjustable molding box 104 is arranged at the site of the control unit 102. In other words, a component model can be generated peripherally at a generating unit 101, and the component 105 can be cast centrally by an adjustable molding box 104. In particular, plural generating units 101 can be coupled to one and the same determining unit 106 and/or the control unit 102 via according transmitting units 103, such that a plurality of different component models, which have been generated at the site of the generating unit 101, are processed at one and the same site, at which the molding box 104 is arranged, and can be cast by the molding box 104.

FIG. 2 shows a schematic representation of a process diagram of a method for molding a component 105 by an adjustable molding box 104 according to an exemplary embodiment of the present invention. The individual method steps may be run (or effected) for example in the determining unit 106 and/or the control unit 102. Beforehand, the component model is generated in the generating unit 101 and is transmitted to the determining unit 106 by the transmitting unit 103.

The selection 201 of materials may be made for example in the determining unit 106 in a next step. This can be made possible for example via an input mask, which is operated by the user. For example, the user may operate the input mask via an internet portal.

Thereafter, the data of the component model are processed in step 202. Further, an oversize of the component can be defined in step 203. The definition 203 of the oversize may be effected for example also via the input mask in the determining unit 106. In particular, an oversize serves to define a desired later post-processing. The oversize can be effected in different dimensions, for example in the z-direction. In the method step 204, control commands for the adjustable molding box are generated by the control unit 102 based on the adjustment data of the casting mold model. The adjustable molding box 104 is adjusted by the adjustment data of the casting mold model.

Furthermore, in step 205, the fabrication time and/or the delivery time can be determined based on the inputted parameters, such as for example the geometric dimensions of the component, or the material composition. Furthermore, the determining unit 106 may exactly determine the delivery time based on the component parameters and based on the amount of orders for components to be fabricated. Thereafter, in step 206, the product data can be summarized and generated by the determining unit 106.

The component is fabricated and/or cast by the molding box 104, which is now adjusted. Thereafter, in step 208, the component 105 is delivered, and is billed (or brought to account) in step 209.

Supplementarily, it is to be noted, that "having" or "comprising" does not exclude other elements or steps, and that "a" or "an" does not exclude a plurality. Furthermore, it is noted that features or steps, which have been described with reference to one of the embodiment examples above, can also be used in combination with other features or steps of other embodiment examples described above. Reference numerals in the claims are not to be considered as a limitation.

LIST OF REFERENCE NUMERALS

100 system
101 generating unit
102 control unit
103 transmitting unit
104 molding box
105 component
106 determining unit
201 selection of materials
202 data processing of the component model
203 definition of oversize
204 control data for molding box
205 determination of fabrication time/delivery time
206 generation product data
207 production/casting of the component
208 delivery of the component
209 billing

The invention claimed is:

1. System for casting a component by an adjustable molding box, the system having the following:
a generating unit for generating a component model of the component to be molded,
a transmitting unit for transmitting the component model via a data network to a determining unit,
the determining unit for determining a casting mold model based on the component model,
wherein the determining unit is configured such that adjustment data for adjusting the adjustable molding box based on the casting mold model are generatable,
wherein the determining unit is configured such that an oversize of the component to be cast is adjustable, wherein the determining unit is configured for determining specific sizes of an oversize of the component to be cast based on the CAD data of the component, wherein the oversize serves for defining a later post-processing of the component, a control unit, which is coupled to the determining unit such that the adjustment data are providable to the control unit, wherein the control unit is configured such that the control unit, based on the adjustment data, adjusts the molding box with a casting mold, which is indicative for a negative profile of the component, and the component is castable by the adjusted molding box, the adjustable molding box, which has the adjustable casting mold, which is indicative for a negative profile of the component, wherein the casting mold is formed such that the component is castable by the adjustable molding box, wherein the generating unit is spatially separate from the control unit, and wherein the transmitting unit is coupled with the generating unit and the determining unit for bidirectional data exchange such that from the generating unit at each arbitrary point in time a status request is transmittable to the determining unit and the control unit, in response to which the determining unit transmits back to the generating unit at least one of the status of the determining of the casting mold model, the status of the adjustment of the molding box from the control unit, and the status of the progress of the casting process.

2. System according to claim 1, wherein the determining unit is configured such that a material of the component to be cast is adjustable.

3. System according to claim 1, wherein the determining unit is configured such that a fabrication time and a delivery time of the cast component to a delivery address are determinable.

\* \* \* \* \*